Oct. 8, 1935.  W. Y. BROWN  2,016,889
CONTROL MEANS FOR LUBRICATION APPARATUS
Filed March 12, 1935   5 Sheets-Sheet 1
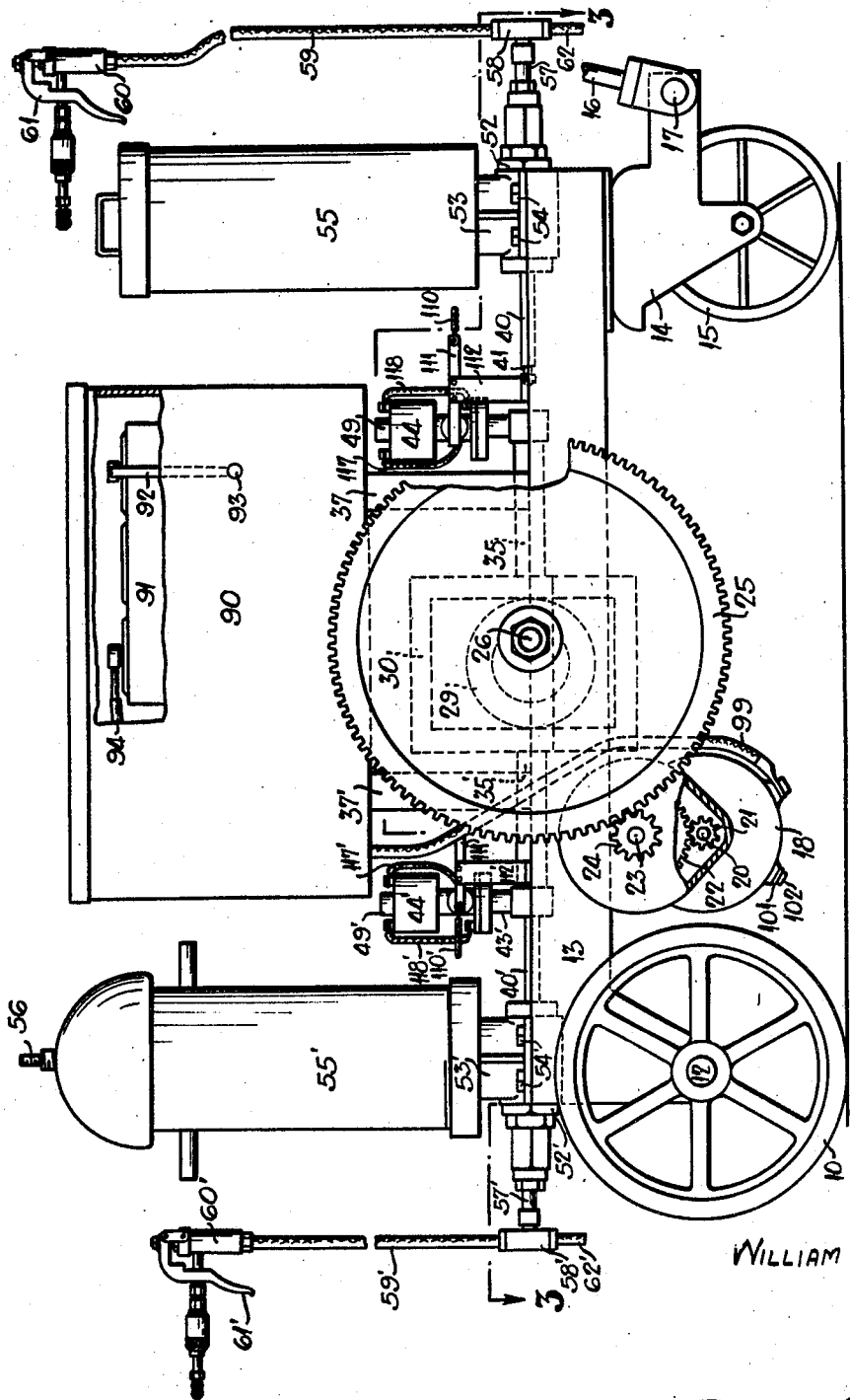
WILLIAM Y. BROWN
Inventor

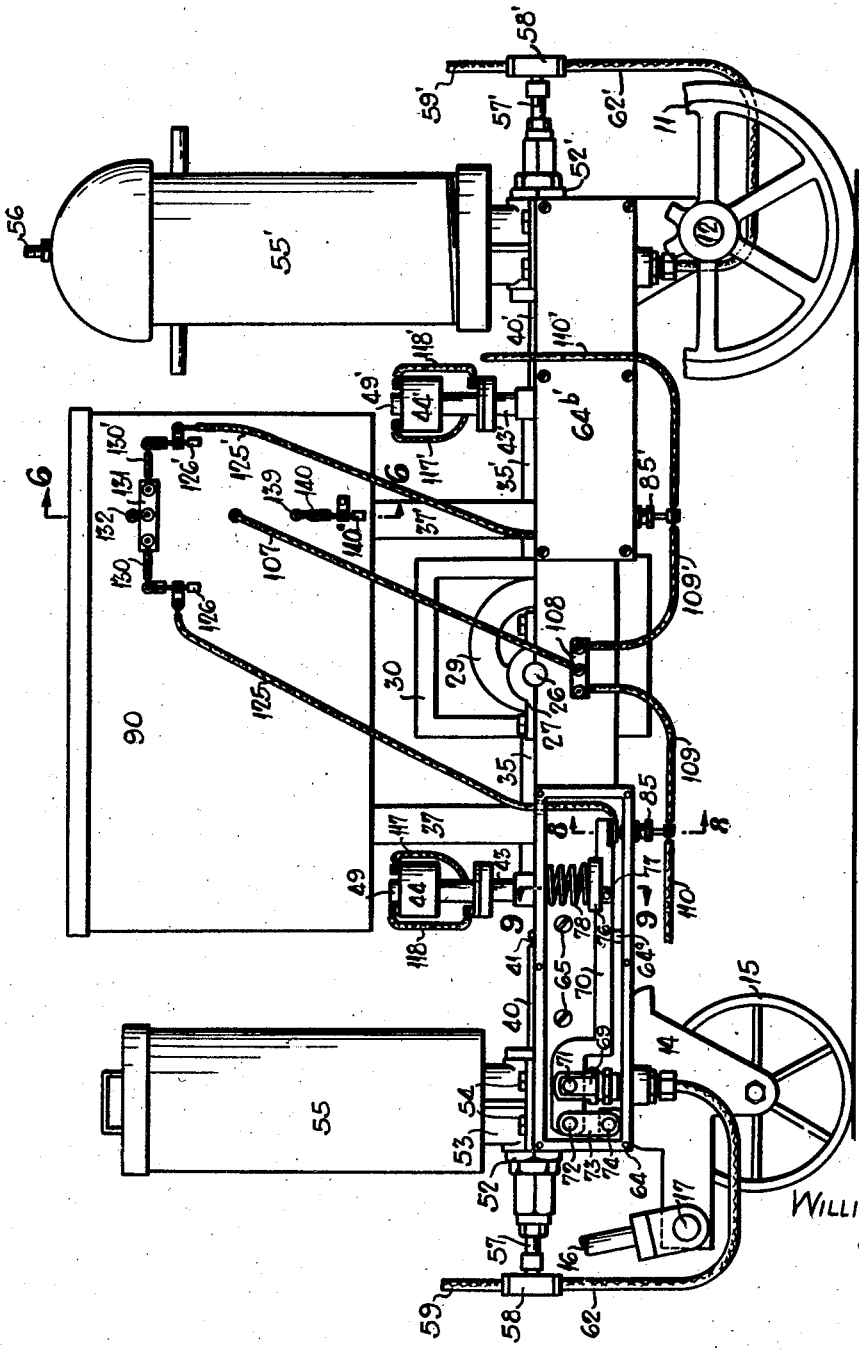

Oct. 8, 1935.  W. Y. BROWN  2,016,889
CONTROL MEANS FOR LUBRICATION APPARATUS
Filed March 12, 1935   5 Sheets-Sheet 3
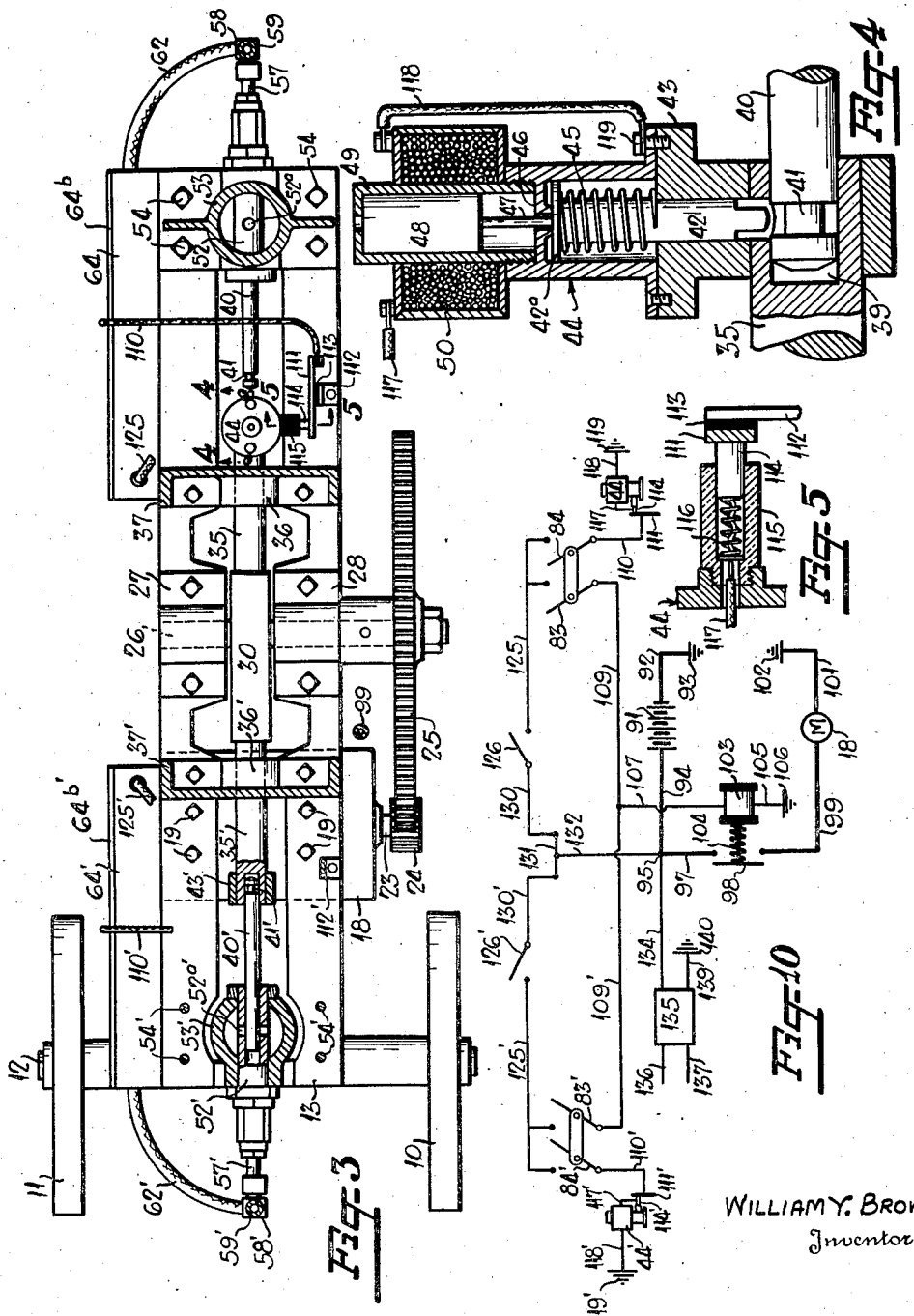
WILLIAM Y. BROWN
Inventor

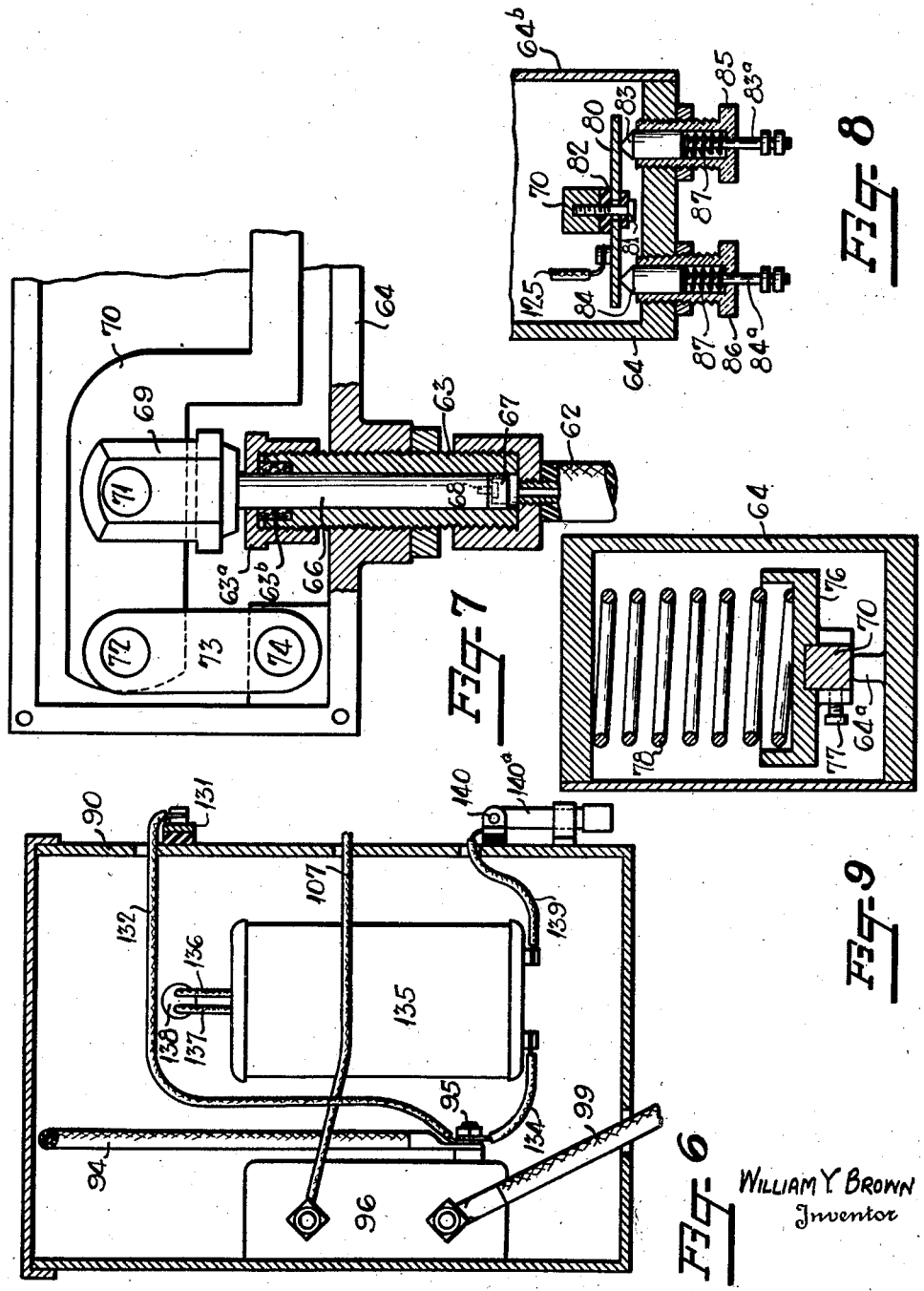

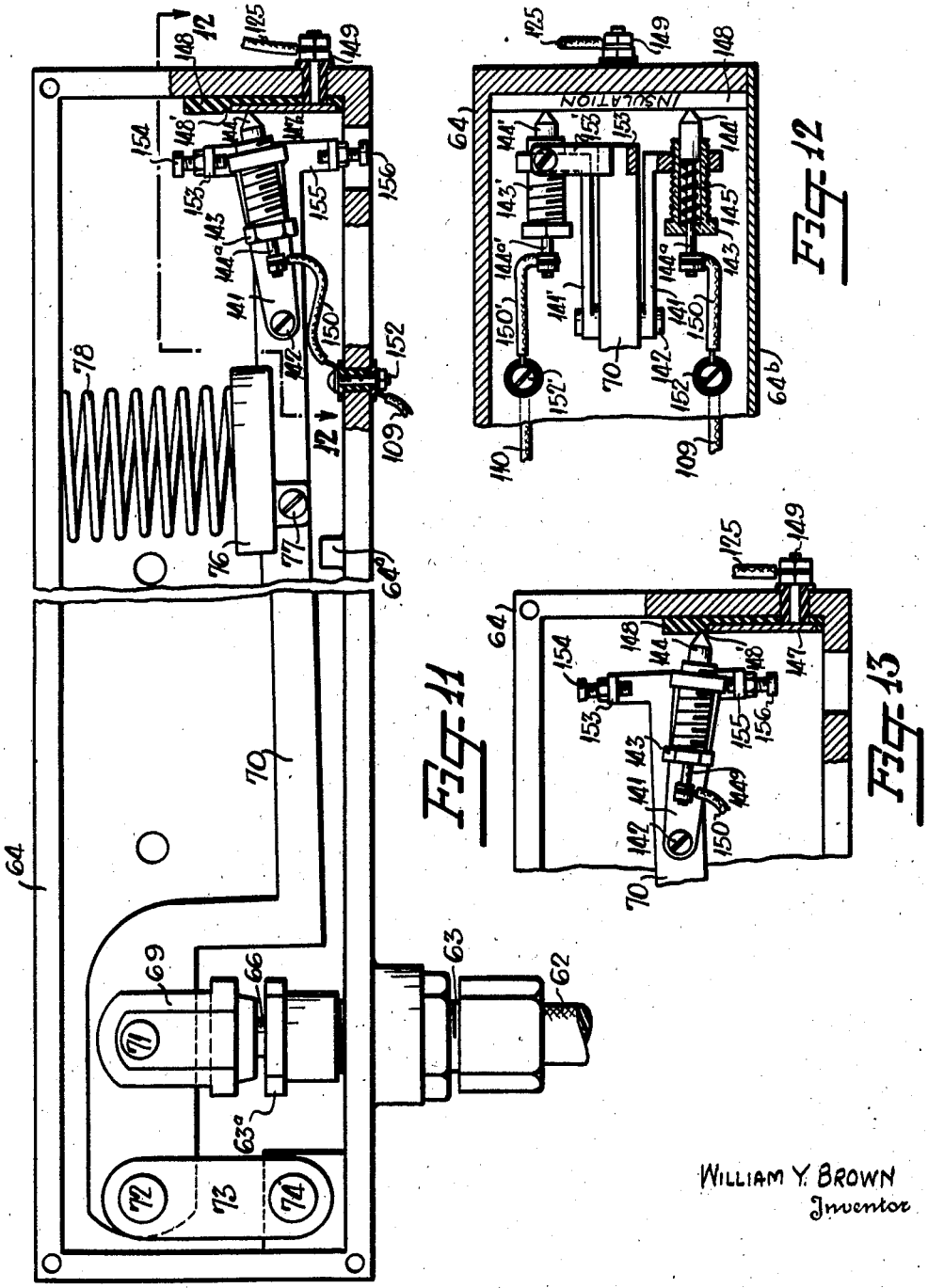

Patented Oct. 8, 1935

2,016,889

UNITED STATES PATENT OFFICE 2,016,889

CONTROL MEANS FOR LUBRICATION APPARATUS

William Y. Brown, Charlotte, N. C., assignor of one-third to William C. Honeycutt, Black Mountain, N. C., and one-third to Robert H. Garland, Charlotte, N. C.

Application March 12, 1935, Serial No. 10,735

7 Claims. (Cl. 221—47.1)

This invention relates to lubrication apparatus, and more especially to apparatus for applying lubricant under pressure to bearing parts of machinery of all descriptions, and especially to automobiles and trucks.

It is an object of this invention to provide in a lubrication apparatus, means for delivering a lubricant under pressure through a suitable hose having a fitting on the end thereof for engaging a fitting on a bearing. This apparatus is provided with means for building up the pressure in the delivery hose, means for automatically stopping the pressure creating means when a predetermined high pressure has been reached and also means for automatically starting the pressure creating means when a predetermined low pressure has been reached. This permits the introduction of lubricant into bearings without starting the pressure creating means each time lubricant is introuced into a bearing.

It is another object of this invention to provide a lubrication apparatus having a lubricant container, a pump for pumping the lubricant from the container and forcing it into a delivery hose having a fitting on the end thereof, with an electric motor for driving the pump and pressure regulated means for stopping the motor when a predetermined high pressure has been built up in the delivery hose, and for automatically starting the motor when the pressure in the delivery hose falls to a predetermined low point, and also having means for automatically connecting a pump to the motor when the pressure in the delivery line therefor falls to a predetermined low point, and for automatically stopping the motor when the pressure in its delivery hose reaches a predetermined high point.

Some of the objects of the invention having been stated, other objects will appear as the description proceeds when taken in connection with the accompanying drawings, in which:—

Figure 1 is an elevation of one side of my apparatus;

Figure 2 is an elevation looking at the opposite side from that shown in Figure 1;

Figure 3 is a sectional plan view taken along line 3—3 in Figure 1;

Figure 4 is a vertical sectional view taken through the magnetic latch along line 4—4 in Figure 3;

Figure 5 is a sectional view taken along line 5—5 in Figure 3;

Figure 6 is a sectional view taken along line 6—6 in Figure 2;

Figure 7 is a view similar to the left-hand central portion of Figure 2, with portions shown in section, showing the details of the pneumatic pressure control;

Figure 8 is a sectional view taken along line 8—8 in Figure 2 showing the means for breaking the electrical contact when a predetermined pressure has been reached;

Figure 9 is a sectional detail view taken along line 9—9 in Figure 2;

Figure 10 is a schematic wiring diagram showing the manner in which my apparatus is wired.

Figure 11 is a view of the pressure control mechanism showing a modified form of a switch attached thereto;

Figure 12 is a sectional plan view taken along line 12—12 in Figure 11;

Figure 13 is a view similar to the right-hand portion of Figure 11 but showing the switch in opened position.

Referring more specifically to the drawings, the numerals 10 and 11 denote the rear wheels of my apparatus which are rotatably mounted on axle 12, said axle 12 being fixedly mounted in the rear portion of framework 13. The front portion of framework 13 has pivotally secured to the lower portion thereof a collar 14, which collar has rotatably mounted in its lower end a swivel wheel 15. This wheel is adapted to be turned in the direction in which the framework and its parts are desired to be placed by means of a suitable tongue 16 which is secured as at 17 to the collar 14 for pulling or pushing the apparatus from place to place. A motor 18 is secured to the lower side of framework 13 by any suitable means such as stud bolts 19. This motor has a shaft 20 upon which is mounted a pinion 21, said pinion 21 being adapted to mesh with gear 22 which is mounted on another shaft 23. Shaft 23 has a smaller gear 24 fixedly mounted thereon and this gear meshes with the large driving gear 25 which is fixedly mounted on main drive shaft 26. It is seen that this series of gears merely acts as speed reducers since the shaft 20 rotates many times faster than the desired speed of the main drive shaft 26.

The main drive shaft 26 is rotatably mounted in bearings 27 and 28 on framework 13 and near the central portion of this shaft is an eccentric 29, which is surrounded by a Scotch yoke 30. Scotch yoke 30 has shafts 35 and 35' integral therewith which are mounted in bearings 36 and 36' of bracket 37 and 37' respectively. These shafts 35 and 35' are identical in all respects and since the apparatus is practically symmetrical about the center line only a description of one side is deemed necessary to properly disclose the invention.

Likewise, the brackets 37 and 37' and their associated parts are identical. It is evident that the shafts 35 and 35' are adapted to reciprocate in the bearings of these brackets since the eccentric 29 will rotate with shaft 26.

In the following description one side of the apparatus will be described, and on the opposite side the parts will be given like reference characters with the prime notation added.

Any difference in structure on the opposite side will be described with different reference characters.

The end of shaft 35 has a bore 39 cut therein in which is adapted to fit a piston 40, said piston 40 having a circumferential groove 41 cut therearound in which the lower end of latch pin 42 is adapted to fit when it is desired that the piston 40 be engaged and operated by the shaft 35. The latch pin 42 is mounted for vertical sliding movement in collar 43 of magnetic latch control 44 and this collar 43 is secured around the end of shaft 35 so as to reciprocate with said shaft. The latch pin 42 has an enlarged head portion 42a which confines the upper end of a spring 45 which is mounted on said pin 42. The lower end of the spring 45 is adapted to rest against the upper portion of collar 43. This spring normally tends to keep the latch 42 in a raised position as shown in Figure 4. A suitable partition 46 is provided for limiting the upward movement of the upper portion of latch pin 42. This partition has a suitable hole therein through which a pin 47 projects, said pin 47 being secured to the lower portion of iron core 48 which is mounted for vertical movement in cylinder 49. A coil 50 is wrapped around cylinder 49 and is connected to a source of electrical energy. When the coil 50 is energized the iron core 48 is pulled downwardly by the magnetic force set up as the result of the current. When this is done the pin 47 will push the latch pin 42 downwardly and cause the lower end of said pin to engage the groove 41 in piston 40 thereby causing piston 40 to be connected to shaft 35. The other end of piston 40 is adapted to slide in cylinder 52, which cylinder is mounted in bracket 53. Bracket 53 is secured to the upper portion of framework 13 by any suitable means such as stud bolts 54. The bracket 53 has mounted on the upper side thereof a suitable container 55 which is adapted to contain grease and the like, and this grease is drawn downwardly through perforations 52a into member 52 from whence it is expelled by piston 40 through fitting 57, T-connection 58 to hose 59.

The end of hose 59 has a suitable nozzle 60 on the end thereof which is controlled by hand lever 61. When lever 61 is operated the grease is allowed to be expelled through this nozzle. The specific details of this nozzle are more clearly disclosed in my co-pending application, Serial No. 736,913.

T-connection 58 has another hose 62 leading therefrom which has its other end connected to the lower side of pipe 63, said pipe 63 being threadably mounted in the lower portion of casing 64 (Fig. 7). Casing 64 is secured to the framework 13 by any suitable means such as screws 65 and a removable cover 64b is secured to the front side thereof in order that one may have access to the parts mounted therein. Pipe 63 has a piston 66 mounted therein and this piston has secured on the lower end thereof a suitable valve or cup washer 67 which is made of any suitable material such as leather and the like. This washer is secured on the lower end of piston 66 by any suitable means such as a screw 68 and when the pressure is built up in the line 62 it is evident that the piston 66 will be caused to rise directly in proportion to the amount of the pressure. Threadably secured to the top of pipe 63 is a nut 63a which is slidably penetrated by piston 66. A packing gland 63b is disposed between this nut and pipe 63 to insure that the pressure in the hose will not escape around piston 66. The upper side of piston 66 has a fitting 69 thereon which is secured to lever 70 as at 71. Lever 70 has one end thereof pivoted as at 72 to a vertically disposed link 73, said link 73 projecting downwardly and being pivotally secured as at 74 to the inside portion of casing 64. The right-hand end of lever 70 has slidably mounted thereon a cup 76, (Figs. 2 and 9), which is secured on lever 70 by any suitable means such as set screw 77, and mounted in this cup is a compression spring 78 whose upper end is adapted to contact the lower side of the top of housing 64. The extreme right-hand end of lever 70 (Figs. 2 and 8), has secured thereto a conductive bar 80 by any suitable means such as screw 81. In order to insulate this bar from member 70, a suitable insulation strip 82 is disposed between the lever 70 and the bar 80 and a suitable washer of any suitable insulating material is disposed between the head of the screw 81 and the bar 80 thereby insuring that no leakage of current will take place between the bar 80 and the lever 70.

The lower side of bar 80 is adapted to be contacted, at times, by contact points 83 and 84 which are mounted in collars 85 and 86 respectively, secured in the lower portion of housing 64. These members 85 and 86 are made of any suitable insulating material and prevent any leakage of current from the contacts to the housing 64. These contacts have restricted portions 83a and 84a around which a suitable spring 87 is disposed for normally forcing the contact points 83 and 84 upwardly against the bar 80.

In order to restrict the downward movement of the right-hand end of lever 70 a projection 64a is provided in the lower portion of casing 64 upon which lever 70 rests when the pressure in the hose connections has been relieved to allow the lever to fall.

A pressure is built up in hose lines 59 and 62 when the nozzle 60 is held closed while the motor continues to run. The piston 66 will be caused to gradually rise under this pressure thereby causing the right-hand end of lever 70 to pivot upwardly about point 72. At the same time the spring 78 will be compressed and the bar 80 will be caused to rise. When bar 80 has risen a sufficient amount to clear the upper ends of contact points 83 and 84, the current will be automatically cut off and the motor will stop running; however, it should be noted that the contacts 83 and 84 will move upwardly and follow the bar 80 until springs 72 have spent their energy and will force the contacts up no farther. During the rising of bar 80 and contacts 83 and 84 a pressure is being built up in the hose and when the bar 80 has risen high enough to break the contact between bar 80 and contacts 83 and 84, the motor will ceases and will not operate until the pressure has been relieved and the bar 80 allowed to be lowered.

Mounted on the upper portion of brackets 37 and 37' is a casing 90 in which is mounted a storage battery 91. A suitable ground wire 92 leads from one side of the battery and is grounded as at 93 to the casing 90, and the other side of battery 91 has a cable 94 leading therefrom which leads to terminal 95 on switch box 96. Another wire 97 leads to one side of a switch 98 and from the other side of said switch a wire 99 leads to a motor 18. A suitable ground wire 101 leads to a ground 102 to ground the motor 18. The switch 98 is operated by a suitable coil 103 which has a spring 104 normally forcing switch 98 in disconnected position. A wire 105 leads from one side of coil 103 and is connected to ground 106. From the other side of coil 103 a wire 107 leads to the bus bar 108 which is connected on the side of framework 13, (Fig. 2), and from this bus bar wire 109 leads to restricted portion 83a of contact 83. Contact point 84 has leading from the lower side thereof a wire 110 which has its other end connected to bus bar 111 which is secured to bracket 112 and is insulated therefrom by any suitable means such as a piece of insulation 113. A brush 114 is adapted to contact the bar 111 at all times and this brush is mounted in a suitable insulating material 115 which in turn is secured to the side of magnetic latch 44. A suitable spring 116 normally presses the brush 114 to the right in Figure 5, at all times. This brush 114 has secured thereto a wire 117 which leads to one side of coil 50 and leading from the other side of coil 50 is a wire 118 which is grounded as at 119 to member 44. By referring to Figures 8 and 10, it is seen that bar 80 has a wire 125 leading therefrom which is connected to one side of a single pole knife switch 126, said knife switch being secured on the side of box 90. Leading from the other side of this switch is wire 130 which has its other end connected to bus bar 131.

A wire 132 leads from the bus bar 131 and is connected as at 95 to the side of member 96 disposed within the container 90. The wiring for the other side of the apparatus is identical in all respects to the wiring just described and the same reference characters will be given these wires with the prime notation added.

When pressure has been built up in the hose lines 59 and 62 to a point where bar 80 will clear the upper ends of contacts 83 and 84 the motor 18 will cease rotation. At this time the handle 61 on the fitting 50 can be operated and the grease will flow from the hose 59 and 62 until the pressure in these lines has been decreased to allow the lever 70 to lower and cause contact to be made between the bar 80 and the contacts 83 and 84. Immediately after this contact is made the current will flow from battery 91 through wires 94, 132, and 125, through switch 83, wires 109, 107 and to coil 103 thereby causing this coil to be energized to close the switch 98 and to allow the current to flow from the battery 91 to motor 18 through wires 94, 97, switch 98 and wire 99. (See Fig. 10.) The switch 84 will be closed simultaneously with switch 83 and the current will flow from battery 91 through wires 94, 132, 130, switch 126, wire 125, switch 84, wires 110 and 117 into magnetic latch 44. When the current flows to this latch the coil 50 is energized and the latch is caused to operate to connect the shaft 35 and the piston 40 which will force the grease from the containers 5 into the hose 59.

This apparatus is so constructed that both ends can be operated simultaneously by closing switches 126 and 126'. When only one of the pumps is desired to be operated one of the switches 126 or 126' will be opened which will cause the corresponding magnetic latch to remain disconnected from its pump while the other pump is being operated.

This apparatus is also equipped with a conventional charging machine which will enable one to recharge the battery at night by merely plugging into a conventional light circuit. Leading from point 95 on switch box 96 is a wire 134 which is connected to one side of this charging machine 135 and leading from the other side of this machine are wires 136 and 137 which lead to a plug 138 in the side of casing 90.

Another wire 139 leads from the charging machine 135 and is grounded as at 140 to a knife switch 140a. When it is desired to charge this machine, the knife switch 140a is closed to effect a ground and the plug 138 is connected to the conventional electric circuit so that the battery 91 can be charged.

The container 55' is similar to container 55 except that means are provided whereby additional air pressure may be introduced in the top of the container through valve 56 to force extra heavy lubricating material into the hose line. The details of the apparatus are more clearly shown in my Patent No. 1,963,399.

It is therefore seen that I have provided an apparatus which automatically maintains a pressure in the grease line between certain limits, thereby eliminating the necessity of extending an electrical circuit from the motor to the nozzle or end of the hose.

Figures 11, 12 and 13 show a slightly modified form of pressure control means which will allow the motor to run until a pressure has been built up to a predetermined point after which the motor will cease to run and magnetic latch 44 will be disconnected. At this time the nozzle 60 may be applied to the fitting to be lubricated and several fittings can be lubricated before the motor will again start running and the latches connected. This means that the switch on the end of lever 70 will not make contact to start the motor until the pressure has been reduced to a very substantial amount below the point where the pressure was cut off. For example, let us suppose that the pressure of 15,000 pounds in the hose connections 59 and 62 will cause the lever 70 to rise high enough to break the contact and to stop the motor, or to the position shown in Figure 13. Then before the contacts would again start the motor and operate the magnetic latch, the pressure would have to be reduced to 10,000 pounds which would allow lever 70 to lower far enough to close the switch.

In order to accomplish this purpose I have provided levers 141 and 141' which are pivoted as at 142 to the lever 70. Lever 141 is L-shaped and has threadably mounted therein a casing 143 which is comprised of any suitable insulating material, in which is mounted a plunger or contact point 144, said plunger 144 having a restricted portion 144a around which spring 145 is mounted. This spring normally forces the end of plunger 144 to the right in Figures 11, 12 and 13 and causes it to either contact the conductive bar 147 or the insulation 148 both of which are secured to the side wall of casing 64. The bar 147 is connected to terminal 149 to which the conventional wire 125, which has been previously described, is attached. Another wire 150 is secured to the end of restricted portion 144a and the other end of this wire is connected to terminal 152 to which conventional wire 109, which has already been described, is secured. The end of member 70 has integral therewith a member 153 which extends upwardly and laterally and which has mounted therein a suitable set screw 154. The lower end of set screw 154 is adapted to limit the upward movement of the free end of member 141. A similar member 155 extends downwardly from the end of lever 70 and has a lateral projection in which is mounted another set screw 156 which restricts the downward movement of member 141. Member 141' and its associated parts are identical in all respects to member 141 and like parts will be given like reference characters with the prime notation added. The member 141' and its associated parts also move with the member 141 and the contact 144' on the end thereof is adapted to make contact simultaneously with the contact 144. The contact point 144 acts as a switch to close the motor circuit whereas the contact 144' acts as a contact to close the circuit which operates the magnetic latch.

When the pressure has been built up in the hose connections 59 and 62 to cause the piston to rise far enough to raise the right-hand end of lever 70 and its associated parts to the position shown in Figure 13, the current will be cut off and then the motor will cease rotation and the magnetic latch will be disconnected, since the ends of contacts 144 and 144' will be engaging the notch 148' in the insulation 148 thereby preventing any current from flowing. When the pressure is released in these hose connections the right-hand end of lever 70 will gradually move downwardly while the ends of contacts 144 and 144' will remain in cavities 148'. When the lever 70 lowers enough to cause screw 154 to contact lever 141 the contacts will move downwardly with lever 70 until they contact bar 147 to close the circuits. Since the levers 141 and 141' are pivoted to the end of lever 70 it is evident that the ends of plungers 144 and 144' will remain in the notches 148' until the end of lever 70 has been allowed to move downwardly a substantial amount thereby allowing the pressure in the hose lines to be partially relieved before the motor is again operated. By this method a pressure interval is provided so that the motor will not again resume operation until the pressure has been relieved a substantial amount.

If it is desired to vary the point at which the motor will be cut off, the set screw 77 can be loosened and the cup 76 and spring 78 can be moved along the lever 70 until the desired point is reached. It is apparent that the nearer spring 78 is moved toward piston 66 the pressure required to raise the lever 70 and break the circuit will be correspondingly decreased.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. Lubrication apparatus comprising a lubricant container, a pump for pumping the lubricant from the container, a delivery hose connected to the output end of said pump, a fitting on the end of the delivery hose for connection to a bearing, an electric motor for driving the pump, means normally disconnecting the pump from the motor, a circuit for the motor, a control circuit, a pressure operated switch in said control circuit, means controlled by the pressure operated switch for opening said control circuit for stopping the motor and disconnecting the motor from the pump when a predetermined high pressure has been created in the delivery hose and for closing said control circuit and connecting the pump to the motor when the pressure in the delivery hose reaches a predetermined low point.

2. Lubrication apparatus comprising a plurality of grease guns, a common electric motor for driving said grease guns, means for selectively connecting the guns to the motor, a delivery hose for each grease gun and pressure operated means on each delivery hose for controlling the motor and connecting and disconnecting its grease gun with relation to the motor.

3. Lubrication apparatus comprising a portable framework, an electric motor mounted on the framework, a plurality of lubricant containers mounted on the framework, a pump associated with each container, a delivery hose connected to the output end of each pump and each hose having a fitting on the other end thereof adapted to be connected to a bearing for forcing lubricant thereinto, a circuit for said motor, a control circuit, a switch in said control circuit for each pump, electro-magnetic means for connecting a pump to the motor, means operable by the pressure in a delivery hose for opening its associated switch to stop the motor and to also disconnect the pump from the motor when a predetermined pressure has been built up and also for closing said circuit and connecting a pump to the motor when a predetermined low pressure has been reached in a delivery hose.

4. Lubrication apparatus comprising a plurality of grease guns, an electric motor having a circuit, means driven by the motor for driving the grease guns, a delivery hose for each grease gun, a control circuit for the motor, electromagnetic means in said control circuit for connecting the guns to the driving means, a pressure operated switch in said control circuit for each delivery hose, the pressure in a particular delivery hose controlling the operation of the motor and also controlling the connecting and disconnecting of that particular grease gun to and from the driving means.

5. Lubrication apparatus comprising a plurality of lubricant containers, a pump associated with each container for pumping the lubricant therefrom, a delivery hose for each pump having one end thereof attached to the output end of said pump and each hose having a fitting on the other end thereof under pressure, an electric motor for driving said pumps, a circuit for the motor, a control circuit, a pressure operated switch associated with each delivery hose and being disposed in parallel in said control circuit, a connection between the delivery hose for a pump and said pressure operated switch, an electromagnetic latch in said control circuit for connecting a pump to the motor, means for normally holding the latch in disconnecting position, the pressure operated switches being adapted to close when the pressure in its associated hose reaches a predetermined low point to start the motor and to operate the said latch to connect its associated pump to the motor, and also being adapted to open the circuit to stop the motor and to disconnect the pump from the motor when a predetermined high pressure has been reached in its associated delivery hose.

6. A lubrication apparatus having a plurality of grease pumps, a delivery hose for each pump, common driving means for the pumps, an electric motor for driving the common driving means, a motor circuit, a second circuit having a switch therein for controlling the motor circuit, pressure means connected to said delivery hose for operating said switch to start and stop said motor, and a third circuit connected to said second circuit for automatically connecting the grease pump for a delivery hose to the driving means when said second circuit is closed and for automatically disconnecting the grease pumps when said second circuit is opened.

7. Lubrication apparatus having a plurality of grease guns each provided with a delivery hose, common driving means for the pumps, and pressure controlled means in each delivery hose for starting and stopping the driving means and for connecting and disconnecting the pumps to and from the common driving means.

WILLIAM Y. BROWN.